US008744730B2

(12) United States Patent
Guggolz et al.

(10) Patent No.: US 8,744,730 B2
(45) Date of Patent: Jun. 3, 2014

(54) METHOD FOR CONTROLLING AN ENGINE BRAKING DEVICE OF AN INTERNAL COMBUSTION ENGINE AND AN INTERNAL COMBUSTION ENGINE FOR A MOTOR VEHICLE

(75) Inventors: Manfred Guggolz, Leonberg (DE); Michael Jesberg, Stuttgart (DE); Bernd Martin, Hochdorf (DE); David Ulmer, Filderstadt (DE); Marc Oliver Wagner, Esslingen (DE)

(73) Assignee: Daimler AG, Stuttgart (DE)

( * ) Notice: Subject to any disclaimer, the term of this patent is extended or adjusted under 35 U.S.C. 154(b) by 477 days.

(21) Appl. No.: 12/802,799

(22) Filed: Jun. 14, 2010

(65) Prior Publication Data

US 2010/0286885 A1 Nov. 11, 2010

Related U.S. Application Data

(63) Continuation-in-part of application No. PCT/EP2008/009160, filed on Oct. 30, 2008.

(30) Foreign Application Priority Data

Dec. 18, 2007 (DE) .......................... 10 2007 060 822

(51) Int. Cl.
*G06F 19/00* (2011.01)
*G06F 7/70* (2006.01)
*B60W 10/06* (2006.01)

(52) U.S. Cl.
CPC ..................................... *B60W 10/06* (2013.01)
USPC ............................. 701/110; 701/70; 701/112

(58) Field of Classification Search
CPC ....................................................... B60W 10/06
USPC .................................... 701/70, 110, 112
See application file for complete search history.

(56) References Cited

U.S. PATENT DOCUMENTS

| 4,787,044 | A | 11/1988 | Nagata et al. |
| 5,842,376 | A | 12/1998 | Dresden, III et al. |
| 6,820,597 | B1 * | 11/2004 | Cullen et al. .................. 123/520 |
| 6,857,491 | B2 * | 2/2005 | Wakashiro et al. ......... 180/65.26 |
| 7,311,079 | B2 * | 12/2007 | Surnilla et al. ................. 123/325 |

FOREIGN PATENT DOCUMENTS

| DE | 39 37 302 | 5/1991 |
| EP | 0 638 455 | 2/1995 |
| EP | 1 092 582 | 4/2001 |
| JP | 57 204359 | 12/1982 |
| JP | 2003 094987 | 4/2003 |
| JP | 2010-538377 | 3/2013 |
| WO | WO 00/37786 | 6/2000 |

* cited by examiner

*Primary Examiner* — Behrang Badii
*Assistant Examiner* — Daniel L Greene
(74) *Attorney, Agent, or Firm* — Klaus J. Bach

(57) ABSTRACT

In a method for controlling an engine braking device of an internal combustion engine of a motor vehicle during an up-shift process of a transmission device connected to the internal combustion engine which includes a first cylinder bank and a second cylinder bank, an engine braking device acting on individual cylinder banks, a fuel supply device acting on individual cylinder banks and a shiftable transmission device, which comprises shiftable gearwheels and an input shaft which can be coupled to a crankshaft of the internal combustion engine by means of a clutch are provided and used during up-shifting to manipulate braking and powering up the cylinder banks and disengaging and up-shifting the transmission for a fast and smooth gear change operations.

10 Claims, 1 Drawing Sheet

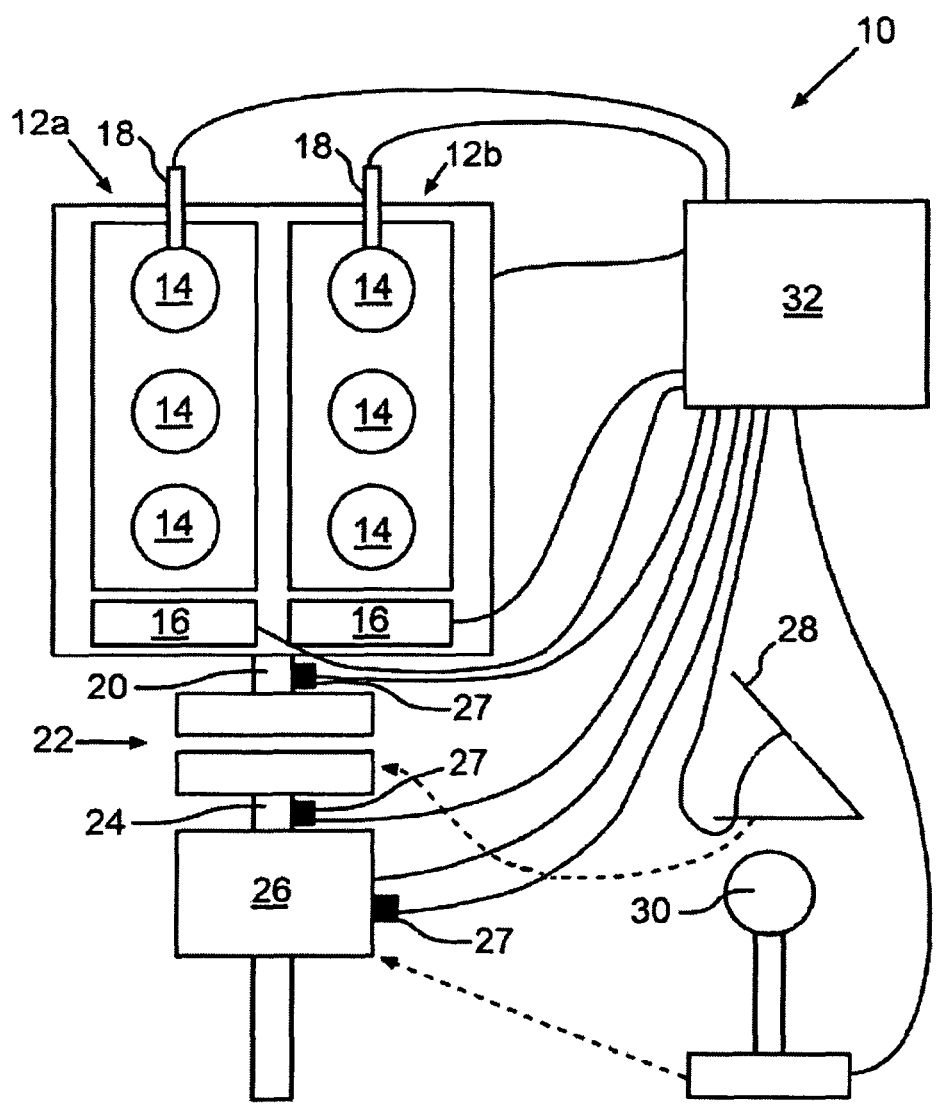

METHOD FOR CONTROLLING AN ENGINE BRAKING DEVICE OF AN INTERNAL COMBUSTION ENGINE AND AN INTERNAL COMBUSTION ENGINE FOR A MOTOR VEHICLE

This is a Continuation-In-Part application of pending international patent application PCT/EP2008/009160 filed Oct. 30, 2008 and claiming the priority of German patent application 10 2007 060 822.7 filed Dec. 18, 2007.

BACKGROUND OF THE INVENTION

The invention relates to methods for controlling an engine braking device of an internal combustion engine of a motor vehicle during an up-shift process of a transmission device of the internal combustion engine and an internal combustion engine for a motor vehicle acting on selected cylinders for controlling a braking operation of the engine.

Such methods and internal combustion engines are already known for example known from DE 39 37 302 A1. An internal combustion engine comprises for example, several cylinders, an engine braking device, a fuel supply device and a shiftable transmission device, which itself comprises an input shaft that can be coupled to the crankshaft of the internal combustion engine by means of a clutch. The engine braking device is used for assisting the transmission device during an upshift process, wherein the upshift process is sensed by means of sensors. With a disengaged gear of the transmission device and a closed clutch, the cylinders are put into the braking operation by a simultaneous activating of the engine braking device and blocking of the fuel supply of the cylinders by means of the fuel supply device. This results in a rapid speed reduction of the internal combustion engine and the input shaft of the transmission device connected to the crankshaft via the closed clutch, so that the shifting time necessary for engaging a higher gear is reduced and a shortening of the traction force interruption is achieved in the power train. After reaching a target difference in speed between gearwheels of the transmission device to be shifted, the up-shift process can be carried out in a speed-synchronized manner and the fuel supply of the cylinders can again be increased after the deactivation of the engine braking device for the build-up of the torque. It is also conceivable that the transmission device has a transmission brake or a blocking synchronization. The transmission brake or the blocking synchronization synchronizes the speeds of the gearwheels to be shifted during an up-shift when the clutch is opened, so that the speed of the crankshaft of the internal combustion engine is adapted to a speed of the input shaft of the transmission device in this case.

The fact that the switch-on or switch-off down times which are necessary for activating or deactivating the engine braking device of the known method and of the known internal combustion engines are comparatively large and lead to an undesired prolongation of the up-shift process is disadvantageous. This is undesired amongst other things due to a low operating comfort.

It is the object of the present invention to provide a method and an internal combustion engine of the type mentioned at the outset, which enable a shortening of the up-shift process and an increase of the operating comfort.

SUMMARY OF THE INVENTION

In a method for controlling an engine braking device of an internal combustion engine of a motor vehicle during an up-shift process of a transmission device connected to the internal combustion engine which includes a first cylinder bank and a second cylinder bank, an engine braking device acting on individual cylinder banks, a fuel supply device acting on individual cylinder banks and a shiftable transmission device, which comprises shiftable gearwheels and an input shaft which can be coupled to a crankshaft of the internal combustion engine by means of a clutch are provided and used during up-shifting to manipulate braking and powering up the cylinder banks and disengaging and up-shifting the transmission for a fast and smooth gear change.

A shortening of the up-shift process and an increase of the operating comfort is achieved in that, during the up-shift process of a transmission device of the internal combustion engine, at least the steps of a) sensing an up-shift process, b) blocking the supply of fuel to a first cylinder bank of the internal combustion engine, c) putting the first cylinder bank into braking operation by means of an engine braking device acting on individual cylinder banks, d) increasing the fuel supply to a second cylinder bank, e) disengaging a gear of the transmission device and f) blocking the fuel supply to the second cylinder bank are performed. The switch-on down time of the engine braking device and thus of the up-shift process of the transmission device is advantageously shortened by means of the method according to the invention. The switch-on down time of the engine braking device is normally caused in that a certain period passes after the switch-on until the engine braking device becomes effective. In contrast to the state of the art, two cylinder banks of the internal combustion engine are thereby controlled independently of each other. The increase of the fuel supply in step d) hereby compensates for the torque reduction caused by putting the first cylinder bank into the braking operation in step c) and upholds the desired torque until the gear is disengaged in step e). As soon as the gear is disengaged, the fuel supply of the second cylinder bank is fully disabled according to step f), so that the internal combustion engine is initially in the braking operation with the first cylinder bank, whereby the speed of the internal combustion engine or of an input shaft of the transmission device is reduced permitting the engagement of a higher gear.

In an advantageous arrangement of the invention, putting the first cylinder bank into the braking mode according to step c) is carried out simultaneously with the blocking of the fuel supply to the first cylinder bank according to step b). The steps b) and c) can be carried out simultaneously, as the fuel supply can be blocked virtually immediately, so that the increase of the fuel supply of the second cylinder bank according to step d) can be started rapidly.

In a further advantageous arrangement of the invention it is provided that subsequently to step f), the second cylinder bank is put into the braking operation after the end of its switch-on down time according to step g), whereby the speed reduction of the internal combustion engine or of the input shaft of the transmission device is further accelerated for reaching the target speed difference required for the speed-synchronized up-shift process.

In a further advantageous embodiment of the invention, putting the second cylinder bank into the braking operation according to step g) is carried out simultaneously with the blocking of the fuel supply to the second cylinder bank according to step f). The steps f) and g) can be carried out simultaneously since the fuel supply can be blocked virtually immediately, so that the speed of the internal combustion engine can be reduced in a particularly fast manner to a required speed after the disengagement of the gear.

A further aspect of the invention relates to a method of controlling an engine braking device of an internal combustion engine of a motor vehicle, wherein a shortening of the up-shift process and an increase of the operating comfort is created according to the invention in that, during an up-shift process of a transmission device, at least the steps a) disengaging a gear of the transmission device, b) blocking the fuel supply to a cylinder bank of a first and second cylinder bank of the internal combustion engine, c) putting the first cylinder bank into the braking mode by means of an engine braking device acting on a particular cylinder bank, d) determining difference in speed between gearwheels of the transmission device or of a crankshaft of the internal combustion engine and an input shaft of the transmission device to be shifted by means of a speed determination device, e) reaching a predetermined first target difference value of the different speeds, f) taking the first cylinder bank out of the braking operation, g) engaging a higher gear of the transmission device, and h) supplying fuel to the second cylinder bank. In contrast to the previous method, the switch-off down time of the engine braking device is shortened with of the present method, whereby the upshift process is also advantageously accelerated. The switch-off down time of the engine braking device normally effects that the engine braking effect upholds for a certain period after the switch-off. The supply of fuel thus has to be blocked for a certain period after the deactivation of the engine braking device, so as to prevent a simultaneous injection and engine braking on a cylinder bank of the internal combustion engine. With this blocking of the fuel supply in the state of the art, a torque cannot again be built up immediately after the deactivation of the engine braking device and the speed of the internal combustion engine often decreases excessively. By braking only the first cylinder bank in step c), the second cylinder bank can be used after step f) and g) in step h) for the torque build-up without considering the switch-off down time of the first cylinder bank. The method additionally results in an improved enhancement of the up-shift process at low temperatures, whereby the ability for shifting is increased further. In addition to an increase of the operating comfort, corresponding cost optimizations are also realized, as no additional mechanical, hydraulic, pneumatic or other measures for reducing the switch-off down time are necessary. It can thereby further be provided that the method is carried out according to one of the preceding embodiments subsequent to a method suitable for shortening the switch-on down time of the engine braking device.

In an advantageous arrangement of the invention, putting the first cylinder bank into the braking operation according to step c) is carried out simultaneously with the blocking of the fuel supply to the first and second cylinder bank according to step b). The steps b) and c) can be carried out simultaneously, as the fuel supply can be blocked virtually immediately, so that the determination of differential speeds according to step d) can be started particularly quickly.

In a further advantageous arrangement of the invention, the taking of the first cylinder bank out of the braking operation according to step f) and/or the engagement of a higher gear of the transmission device according to step g) and/or the supply of fuel to the second cylinder bank according to step h) is carried out simultaneously, as, in this manner, an immediate torque build-up of the internal combustion engine after the deactivation of the engine braking device is made possible and/or a gear can be engaged in a very fast manner.

In a further advantageous arrangement of the invention, after step h), fuel is supplied to the first cylinder bank by means of the fuel supply device right after a switch-off down time of the engine braking device of the first cylinder bank (12a). The two cylinder banks are hereby in active operation and the internal combustion engine can provide a correspondingly high drive torque.

A further method for controlling the engine braking device, which enables a shortening of the up-shift process and an increase of the operating comfort, is provided according to the invention in that, during an up-shifting process of a transmission device, at least the steps a) disengaging a gear of the transmission device, b) blocking the supply of fuel to individual cylinder banks of a first and second cylinder bank of the internal combustion engine, c) putting the first and second cylinder bank of the internal combustion engine into the braking operation by means of an engine braking device acting on individual cylinder banks, d) determining difference speeds between gearwheels of the transmission device or of a crankshaft of the internal combustion engine and an input shaft of the transmission device to be shifted by means of a speed determination device, e) reaching a predetermined first target difference number of the difference speeds, f) taking the second cylinder bank out of the braking operation, g) reaching a predetermined second target value of the speed difference, h) taking the first cylinder bank out of the braking operation; i) engaging a higher gear of the transmission device, and j) supplying fuel to the second cylinder bank are carried out. This method also shortens the switch-off down time of the engine braking device and thus enables an acceleration of the up-shift process together with the advantages connected therewith, already described. In step c), both cylinder banks are initially put into the braking operation, however, in step f), the second cylinder bank is already taken out of the braking operation prior to reaching the second target difference speed and is again available for the torque build-up. As soon as the second target difference speed is reached in step g), the first cylinder bank is also taken out of the braking operation in step h). Due to the switch-off down time of the engine braking device, the first cylinder bank thereby however brakes for a further period. This is compensated for after engaging a higher gear in step i) by means of the supply of fuel to the second cylinder bank in step j), so that a torque build-up of the internal combustion engine is still possible. It can also be provided with this method that the method can be carried out following a method according to one of the previous embodiments for shortening the switch-on dead time of the engine braking device.

In an advantageous arrangement of the invention it is provided that the putting of the first and second cylinder bank into the braking operation according to step c) is carried out simultaneously with the blocking of the fuel supply to the first and the second cylinder bank according to step b). The steps b) and c) can be carried out simultaneously, as the fuel supply can be blocked virtually immediately, so that the determination of the speed difference according to step d) can be started rapidly.

In a further advantageous arrangement of the invention, the first target speed difference in step e) is chosen in such a manner that the second target speed difference in step g) is reached during a switch-off down time of the engine braking device assigned to the second cylinder bank. In other words, the second cylinder bank in step e) is taken out of the braking operation, if it is expected that the second target speed difference can be reached in a safe manner within the switch-off down time of the second cylinder bank.

In a further advantageous arrangement of the invention, taking the first cylinder bank out of the braking operation according to step h) and/or the engagement of a higher gear of the transmission device according to step i) and/or the supply of fuel to the second cylinder bank according to step j) is carried out simultaneously, as an immediate torque build-up of the internal combustion engine is made possible in this manner after the deactivation of the engine braking device and/or a gear can be engaged rapidly.

In a further advantageous arrangement of the invention, fuel is supplied to the first cylinder bank by means of the fuel supply device after step i) in a further step j), as soon as a switch-off down time of the first cylinder bank has ended. The two cylinder banks are in the fired-up operation hereby and the internal combustion engine can provide a correspondingly high drive torque.

A further aspect of the invention relates to an internal combustion engine for a motor vehicle, in particular a commercial vehicle, wherein a shortening of the up-shift process and an increase of the operating comfort is made possible according to the invention in that the internal combustion engine is designed to carry out a method as described earlier. The advantages resulting therefrom are as described above.

It has been shown to be advantageous that the engine braking device is in the form of a pressure brake and/or a decompression brake and/or a turbo brake. Each of the mentioned engine brake types is thereby—in contrast to for example retarders—suitable for the braking operation acting on individual cylinder banks, wherein an exhaust gas system of the internal combustion engine has to be formed correspondingly in a multi-pass arrangement with a motor braking device as a pressure brake or as a turbo brake. The braking energy of the internal combustion engine can thereby be improved further by providing several engine braking devices, for example an engine braking device in the form of a pressure brake and a decompression brake.

In a further advantageous arrangement of the invention it is provided that the transmission device is in the form of a manual, a semi-automatic or a fully automatic transmission. This permits a high design flexibility for the internal combustion engine and a corresponding operating convenience.

The invention will become more readily apparent from the following description of a particular embodiment thereof with reference to the drawings.

BRIEF DESCRIPTION OF THE DRAWINGS

The single FIGURE shows schematically and embodiment of an internal combustion engine according to the invention.

DESCRIPTION OF PREFERRED EMBODIMENTS

The only FIGURE, in which the same elements or elements functioning in the same manner are provided with identical reference numerals, shows schematically of an internal combustion engine 10 for a motor vehicle. The internal combustion engine 10, which is in the form of a piston engine of a commercial motor vehicle (not shown), comprises a first cylinder bank 12a and a second cylinder bank 12b each with three cylinders 14. However, the cylinder banks 12a, 12b only one cylinder 14 in the simplest arrangement. Alternatively or additionally it can be provided that the first or the second cylinder bank 12a, 12b does not coincide with geometric cylinder rows as shown, but the cylinders may be arranged in a row, and/or have a number of cylinders 14 which differs from the other. An engine braking device 16 acting on individual cylinder banks is assigned to the first and the second cylinder bank 12, 12b, by means of which device the first and the second cylinder bank 12a, 12b can be put into the braking operation or be taken out of the braking operation independently of each other. The engine braking device can thereby for example be in the form of a pressure brake, a decompression brake, or a turbo brake. Alternative arrangement forms or combinations of two or more engine brake types are however also conceivable. Suitable engine braking device types can for example be taken from EP 458 857 B1 or US 2006/0005796 A1. The putting into the braking operation or the taking out of the braking operation of the first or the second cylinder bank during the controlling of the engine braking device 16 takes place depending on the respective engine braking device type. The internal combustion engine 10 further comprises a fuel supply unit 18 acting on individual cylinder banks, by means of which the two cylinder banks are supplied with fuel independently of each other. The fuel supply device 18 may act on individual cylinders—for example as an injection device with injection valves or injection nozzles that can be actuated on individual cylinders—. The cylinders 14 of the internal combustion engine drive a crankshaft 20, which can be coupled or decoupled to and from an input shaft 24 of a shiftable transmission device 26 by means of a clutch that can be disengaged. A speed determination device 27 is assigned to the crankshaft 20, the input shaft 24 and the transmission device 26, so that the respective speeds or speed difference can be determined. The speed determination device 27 hereby determines with block-synchronized transmission devices 26 or transmission devices 26 with a transmission brake, a speed difference between gearwheels of the transmission device 26 which are to be shifted, or, with unsynchronized transmission devices 26, speed difference between the crankshaft 20 and the input shaft 24. The clutch 22 can be operated in a usual manner via a clutch pedal 28, the transmission device 26 via an associated gearshift lever 30. Instead of the shown manually actuated embodiment of the transmission device 26, a semi-automatic or a fully automatic arrangement of the transmission device 26 or of a clutch 22 can also be provided. The engine braking device 16, the fuel supply device 18, the transmission device 26, the speed determination device 27, the clutch pedal 28 and the gearshift lever 30 are coupled to an engine control device 32 of the internal combustion engine 10 for exchanging control signals, which controls different functions of the internal combustion engine 10. Alternatively, several control devices communicating with each other may of course also be provided.

In order to achieve a reduction in the shifting times and an increase of the operating comfort during an up-shift process of the transmission device 26, different suitable methods for controlling the engine braking device 16 are explained in the following by means of the shown internal combustion engine 10. The engine braking device 26 thereby supports the transmission device 26 and enables an accelerated adaptation between a speed of gearwheels of the transmission device or of the crankshaft 20 and the input shaft 24 of the transmission device 26. The engine braking device 16 has a switch-on and a switch-off down time, which respectively lead to an extension of the up-shift process. The switch-off down time additionally results in a supply of fuel by means of the fuel supply device 18 being blocked for a certain period after switching off the engine braking device 16 with the methods known from the state of the art in order to prevent a simultaneous injection of fuel by means of the fuel supply device 18 in the fired-up operation and braking of the internal combustion engine 10.

For shortening the switch-on down time of the engine braking device 16, the up-shift process is initially sensed by means of sensors not shown in detail at the gearshift lever 30 and/or the necessity of an up-shift is sensed by means of a corresponding function in a control program of the engine control device 32. The fuel supply is blocked for the first cylinder bank 12a by means of the fuel supply device 16 acting on individual cylinder banks and the engine braking device 16 acting on individual cylinder banks is put into braking operation. In order to compensate for the braking action caused hereby and to uphold a desired torque, a fuel supply to the second cylinder bank 12b by the fuel supply device 18 is increased, for example by injecting a larger injection amount. After a gear of the transmission device 26 has been disengaged manually by means of the gearshift lever 30 or automatically by means of a control command of the engine control device 32, the fuel supply of the second cylinder bank is blocked. Simultaneously or subsequently, the second cylinder bank 12b is put into braking operation, whereby all cylinders 14 of the internal combustion engine 10 are in braking operation after the switch-on down time of the engine braking device 16 of the second cylinder bank and cause an accelerated speed adaptation between the crankshaft 20 and the input shaft 24.

In order to eliminate the conventional necessity for blocking the fuel supply for a certain period due to the switch-off down time of the engine braking device 16, the first cylinder bank 12a is put into braking operation alternatively or subsequently during an up-shift process. By determining speed differences between gearwheels of the transmission device 26 or the crankshaft 20 and the input shaft 21 to be shifted by means of the speed determination device 27, the reaching of a desired target speed difference is monitored. The target speed difference usually goes towards a value zero. As soon as the target speed difference is achieved, a higher gear is engaged and the first cylinder bank 12 is taken out of the braking operation. At the same time, fuel is supplied to the second cylinder bank 12b, for a torque build-up of the internal combustion engine.

Alternatively, the switch-off down time of the engine braking device 16 can be eliminated in that the first cylinder bank 12a and the second cylinder bank 12b are initially together put into the braking operation by means of the engine braking device 16. If it is expected that a first target speed difference is reached securely in the switch-off down time of the engine braking device 16 assigned to the second cylinder bank 12b, the second cylinder bank is prematurely taken out of the braking operation. As soon as the speed difference between the crankshaft 20 and the input shaft 24 of the transmission device 26 reaches a second lower target speed difference, the first cylinder bank is also taken out of the braking operation and a higher gear is engaged. Due to the switch-off down time of the engine braking device 16, the first cylinder bank 12 however brakes for a further period. This is compensated for in that a corresponding fuel amount is supplied to the second cylinder bank and that a corresponding torque build-up is facilitated. As soon as the switch-off down time of the engine braking device 16 assigned to the first cylinder bank 12a has ended, fuel can again be injected into all cylinders 14.

What is claimed is:

1. A method for controlling an engine braking device (16) of an internal combustion engine (10) of a motor vehicle during an up-shift process of a transmission device (26) connected to the internal combustion engine (10), the engine having a first and a second cylinder bank (12a, 12b), an engine braking device (16) acting selectively on the first and the second cylinder banks (12a, 12b) for independently engaging or disengaging braking operation of the individual cylinder banks, the method comprising the steps of:
   a) sensing an up-shift process demand;
   b) blocking the fuel supply to the first cylinder bank (12a) of the internal combustion engine (10) and simultaneously
   c) putting the first cylinder bank (12a) into braking mode by means of an engine braking device (16) acting on the first cylinder banks (12a);
   d) and, at the same time, increasing the fuel supply to the second cylinder bank (12b), so as to compensate for the power loss of the first cylinder bank,
   e) disengaging a gear of the transmission device (26) and concurrently
   f) blocking the fuel supply to the second cylinder bank (12b) for a rapid slow down of the engine to a predetermined speed permitting upshifting, and re-powering all the cylinders.

2. The method according to claim 1, comprising
   g) putting also the second cylinder bank (12b) into the braking mode.

3. The method according to claim 2, wherein the putting of the second cylinder bank (12b) into the braking mode according to step g) is carried out simultaneously with the blocking of the fuel supply to the second cylinder bank (12a, 12b) according to step f).

4. A method for controlling an engine braking device (16) of an internal combustion engine (10) of a motor vehicle, the engine having a first and a second cylinder bank (12a, 12b), an engine braking device (16) acting selectively on the first and the second cylinder banks (12a, 12b) for independently engaging or disengaging braking operation of the individual cylinder banks, the method comprising, during an up-shift process of a transmission device (26) of the internal combustion engine (10), the steps of:
   a) disengaging a gear of the transmission device (26);
   b) blocking the supply of a fuel to the cylinders of the first and second cylinder banks (12a, 12b) of the internal combustion engine (10); and simultaneously
   c) putting the first and second cylinder banks (12a) into braking operation by means of an engine braking device (16) acting on the first cylinder bank and the second cylinder bank;
   d) determining a speed difference between gearwheels of the transmission device (26) or of a crankshaft (20) of the internal combustion engine (10) and an input shaft (24) of the transmission device (26) to be shifted; and,
   e) upon reaching a predetermined first target difference value of the speed difference, simultaneously
   f) taking the first cylinder bank (12a) out of the braking operation;
   g) engaging a higher gear of the transmission device (26) and
   h) supplying fuel to the second cylinder bank (12b).

5. The method according to claim 4, wherein, after step h), fuel is supplied to the first cylinder bank (12a) by means of the fuel supply device (18) in a further step i) as soon as a switch-off down time of the engine braking device (16) of the first cylinder bank (12a) has ended.

6. A method for controlling an engine braking device (16) of an internal combustion engine (10) of a motor vehicle, during an up-shift process of a transmission device (26) of the internal combustion engine (10) the engine having a first and a second cylinder bank (12a, 12b), an engine braking device (16) acting selectively on the first and the second cylinder banks (12a, 12b) for independently engaging or disengaging braking operation of the individual cylinder banks, the method comprising the steps of:
   a) disengaging a gear of the transmission device (26);
   b) blocking the supply of a fuel to the first and second cylinder bank (12a, 12b) of the internal combustion engine (10); and simultaneously c) putting the first and the second cylinder bank (12a, 12b) into braking operation by means of engine braking device (16) acting on the individual cylinder banks;
d) determining a speed difference between gearwheels of the transmission device (26) or of a crankshaft (20) of the internal combustion engine (10) and an input shaft (24) of the transmission device (26) by means of a speed determination device (27);
e) reaching a predetermined first target difference value of the speed difference;
f) taking the second cylinder bank (12b) out of the braking operation;
g) reaching a predetermined second target difference value of the speed difference;
h) taking the first cylinder bank (12a) out of the braking operation;
i) engaging a higher gear of the transmission device (26) and
j) supplying fuel to the second cylinder bank (12b).

7. The method according to claim 6, wherein the first target speed difference in step e) is chosen in such a manner that the second target speed difference in step g) is reached during a switch-off down time of the engine braking device (16) of the second cylinder bank (12b).

8. The method according to claim 6, wherein taking the first cylinder bank (12a) out of the braking operation according to step h) and at least one of the engagement of a higher gear of the transmission device according to step i) and the supply of fuel to the second cylinder bank (12b) according to step j) are carried out simultaneously.

9. The method according to claim 6, wherein, after step j), fuel is supplied to the first cylinder bank (12a) by means of the fuel supply device (18) in a further step k),as soon as a switch-off down time of the engine braking device (16) of the first cylinder bank (12a) has ended.

10. An internal combustion engine (10) for a motor vehicle, including an internal combustion engine with a first cylinder bank (12a) and a second cylinder bank (12b), an engine braking device (16) acting on individual cylinder banks, a fuel supply device (18) acting on individual cylinder banks and a shiftable transmission device (26), which comprises shiftable gearwheels and an input shaft (24) that can be coupled to a crankshaft (20) of the internal combustion engine (10) by means of a clutch (22), the internal combustion engine (10) being designed to carry out a method according to claim 1.

* * * * *